(12) United States Patent
Tan et al.

(10) Patent No.: US 12,026,989 B2
(45) Date of Patent: Jul. 2, 2024

(54) DUAL REMOTE AUTOMOBILE DIAGNOSTIC METHOD, SYSTEM, APPARATUS AND COMPUTER EQUIPMENT

(71) Applicant: THINKCAR TECH CO., LTD., Guangdong (CN)

(72) Inventors: Bin Tan, Guangdong (CN); Wei Zhang, Guangdong (CN); Bin Guo, Guangdong (CN)

(73) Assignee: THINKCAR TECH CO., LTD., Shenzhen (CN)

( * ) Notice: Subject to any disclaimer, the term of this patent is extended or adjusted under 35 U.S.C. 154(b) by 370 days.

(21) Appl. No.: 17/546,043

(22) Filed: Dec. 8, 2021

(65) Prior Publication Data
US 2023/0066488 A1 Mar. 2, 2023

(30) Foreign Application Priority Data
Aug. 30, 2021 (CN) .......................... 202111000018.8

(51) Int. Cl.
*G07C 5/00* (2006.01)
*G07C 5/08* (2006.01)
*H04L 65/1069* (2022.01)

(52) U.S. Cl.
CPC ........... *G07C 5/008* (2013.01); *G07C 5/0808* (2013.01); *H04L 65/1069* (2013.01)

(58) Field of Classification Search
CPC .... G07C 5/008; G07C 5/0808; H04L 65/1069
(Continued)

(56) References Cited

U.S. PATENT DOCUMENTS

| 11,335,139 B1* | 5/2022 | Brunda | ................ G07C 5/0808 |
| 2009/0062978 A1* | 3/2009 | Picard | ................ G06Q 30/0611 |
| | | | 701/31.4 |

(Continued)

FOREIGN PATENT DOCUMENTS

| CN | 101834879 A | 9/2010 |
| CN | 102183945 A | 9/2011 |

(Continued)

OTHER PUBLICATIONS

European Search Report of European Patent Application No. 21217164.9 issued on Jun. 20, 2022.

*Primary Examiner* — Peter D Nolan
*Assistant Examiner* — Luke Huynh

(57) ABSTRACT

The present application discloses a dual remote automobile diagnostic method, system, apparatus and a computer equipment. By establishing a remote communication connection with a target terminal, the second diagnostic apparatus obtains automobile data received by the service device while the first diagnostic apparatus is in continuous communication connection with the target terminal, so that the second diagnostic apparatus can perform remote diagnosis of the automobile. The target terminal can also directly perform remote control on the first diagnostic apparatus, so that the first diagnostic apparatus can diagnose faults of an automobile under the control of the target terminal. Namely, the faults can be diagnosed using the dual remote diagnostic method, so that there is no need to drive the automobile to the repair shop for professional maintenance. For local diagnosis or single-remote diagnosis, a continuous remote communication may be carried out during the remote diagnosis process.

13 Claims, 3 Drawing Sheets

(58) Field of Classification Search
USPC .......................................................... 701/29.1
See application file for complete search history.

(56) References Cited

U.S. PATENT DOCUMENTS

| | | | |
|---|---|---|---|
| 2015/0121275 A1* | 4/2015 | Marshall | ................ G07C 5/008 |
| | | | 715/771 |
| 2018/0151003 A1* | 5/2018 | Grobler | ............. G06F 16/90335 |
| 2020/0351110 A1 | 11/2020 | Yang et al. | |
| 2021/0014318 A1* | 1/2021 | Xiao | ........................ H04L 67/01 |

FOREIGN PATENT DOCUMENTS

| | | |
|---|---|---|
| CN | 103676922 A | 3/2014 |
| CN | 105847178 A | 8/2016 |
| CN | 109727103 A | 5/2019 |
| CN | 109993850 A | 7/2019 |
| CN | 212964037 U | 4/2021 |

\* cited by examiner

DUAL REMOTE AUTOMOBILE DIAGNOSTIC METHOD, SYSTEM, APPARATUS AND COMPUTER EQUIPMENT

CROSS REFERENCE TO RELATED APPLICATION

This application claims priority from Chinese patent application No. 202111000018.8 filed on Aug. 30, 2021, the content of which is hereby incorporated by reference.

TECHNICAL FIELD

This application relates to remote diagnosis technology, in particular to a dual remote automobile diagnostic method, system, apparatus and a computer equipment.

BACKGROUND

At present, an automobile is usually repaired in an automobile sales service shop or a repair shop, or is repaired by users themselves, and occasionally there may be situations in which the repair cannot be completed due to insufficient experience.

Based on the above situation, a remote automobile diagnosis technology has emerged, that is, a remote fault diagnostic instrument is connected to an on-board diagnostics (OBD) interface of the automobile to collect parameters of the automobile and upload them to a cloud server, and then a feedback including diagnosis and repair suggestion report is sent from the cloud server based on the uploaded automobile parameters. After receiving the diagnosis and repair suggestion report through other terminals, the users may refer to the report and repair the automobile by themselves. However, although the users can read and refer to the report for automobile repairing, they may not be able to complete the repairs independently, and more technical support is needed during the repairing process. It can be seen that the existing remote automobile diagnosis technology cannot provide comprehensive and reliable diagnosis data, and users cannot diagnose the automobile by themselves.

SUMMARY OF THE APPLICATION

An objective of the present application is to provide a dual remote automobile diagnostic method, system, apparatus and a computer equipment, in order to the above-mentioned problems.

Provided is a dual remote automobile diagnostic method, which is applied to a first diagnostic apparatus in communication connection with an automobile, the method includes:

sending a request for instant communication to a target terminal to establish a remote communication connection with the target terminal;

receiving a connection address for remote communication sent by the target terminal;

establishing a remote communication link with a service device according to the connection address received;

obtaining automobile data required for a fault diagnosis, and sending the automobile data to the service device, wherein, the service device is in communication connection with a second diagnostic apparatus, and the second diagnostic apparatus is used for reading the automobile data and perform a remote diagnosis based on the automobile data; and receiving a control signal sent by the target terminal, and executing a diagnosis action corresponding to the control signal, so that the automobile is remotely diagnosed by the target terminal.

Preferably, sending a request for instant communication to a target terminal to establish a remote communication connection with the target terminal includes:

obtaining an online terminal list, where the online terminal list includes a plurality of online terminals;

selecting one online terminal from the online terminal list as a target terminal, and establishing a session window for the target terminal, wherein the session window is used for interaction of communication information with the target terminal, and the communication information consists of one or more of picture information, voice information, video information, and text information;

sending the request for instant communication to the target terminal in the session window, and determining whether the target terminal agrees to receive the request for instant communication, wherein the request for instant communication includes a voice communication request and a video communication request;

receiving order information sent by the target terminal if the target terminal agrees to receive the request for instant communication, where the order information includes merchant information and a diagnosis fee;

determining whether to confirm the remote communication connection with the target terminal according to the order information;

sending payment information to the target terminal according to the diagnosis fee, if the remote communication connection with the target terminal is confirmed; and receiving a request signal of instant communication fed back by the target terminal in response to the payment information, in order to establish the remote communication connection with the target terminal.

Preferably, obtaining automobile data required for a fault diagnosis and sending the automobile data to the service device includes:

receiving a request of automobile information sent by the target terminal for a plurality of times;

obtaining the automobile data corresponding to each request of automobile information according the request of automobile information received;

obtaining a current network delay value;

determining whether the current network delay value exceeds a preset threshold, and sending the automobile data to a transit server if the current network delay value exceeds the preset threshold, so as to send the automobile data to the service device through the transit server; and sending the automobile data to the service device based on User Datagram Protocol (UDP) if the current network delay value does not exceed the preset threshold.

Preferably, after obtaining automobile data required for a fault diagnosis and sending the automobile data to the service device, the method further includes:

receiving programming data transmitted by the service device, the programming data being generated by the second diagnostic apparatus according to the automobile data; and converting the programming data into a repair instruction and sending the programming data to the automobile, so that the automobile executes a corresponding program according to the repair instruction.

Preferably, before sending a request for instant communication to a target terminal, the method further includes:

reading a unique identification serial number of the automobile;

determining whether the unique identification serial number matches a vehicle identification number in a cloud server;

obtaining vehicle information of the automobile according to the unique identification serial number if the unique identification serial number matches with the vehicle identification number in the cloud server, where the vehicle information consists of one or more of model information, vehicle type information, automobile manufacturer information, engine information, and chassis serial number information; and performing a local diagnosis to the automobile based on the vehicle information.

The present application further provides a dual remote automobile diagnostic system, which includes:

a first diagnostic apparatus in communication connection with an automobile for obtaining automobile data required for fault diagnosis;

a target terminal in remote communication connection with the first diagnostic apparatus, the target terminal being used for establishing the remote communication connection with the first diagnostic apparatus, and remotely controlling the first diagnostic apparatus;

a service device in remote connection with the first diagnostic apparatus, for receiving the automobile data obtained by the first diagnostic apparatus; and a second diagnostic apparatus in communication connection with the service device, for remotely diagnosing the automobile based on the automobile data received from the service device.

Preferably, the first diagnostic apparatus includes:

an obtaining module for obtaining an online terminal list, the online terminal list including a plurality of online terminals;

an establishing module for selecting one online terminal from the online terminal list as a target terminal, and establishing a session window with the target terminal, the session window being used for interacting with the target terminal for communication information, and the communication information consisting of one or more of picture information, voice information, video information, and text information;

a sending module for sending a request for instant communication to the target terminal in the session window, and determining whether the target terminal agrees to receive the request for instant communication, where the request for instant communication includes a voice communication request and a video communication request;

a first receiving module for receiving order information from the target terminal if the target terminal agrees to receive the request for instant communication, the order information including merchant information and a diagnosis fee;

a determining module for determining whether to establish a remote communication connection with the target terminal according to the order information;

a confirmation module for sending payment information to the target terminal according to the diagnosis fee if the remote communication connection with the target terminal is determined to be established; and a second receiving module for receiving a request signal of instant communication fed back by the target terminal according to the payment information, so as to establish the remote communication connection with the target terminal.

The present application further provides a dual remote automobile diagnostic apparatus, which includes:

a remote-communication establishing module for sending a request for instant communication to a target terminal to establish a remote communication connection with the target terminal;

an address receiving module for receiving a connection address for remote communication sent by the target terminal;

a communication-link establishing module for establishing a remote communication link with a service device according to the connection address received;

a first remote diagnostic module for obtaining automobile data required for a fault diagnosis, and sending the automobile data to the service device, where the service device is in communication connection with a second diagnostic apparatus, and the second diagnostic apparatus is used to read the automobile data and perform a remote diagnosis of faults based on the automobile data; and a second remote diagnostic module for receiving a control signal sent by the target terminal, and executing a diagnosis action corresponding to the control signal, so that the automobile is remotely diagnosed by the target terminal.

The present application further provides a computer equipment, which includes a memory and a processor, the memory stores a computer program, and the processor implements the above-mentioned dual remote automobile diagnostic method when the processor executes the computer program.

The present application further provides a computer-readable storage medium on which a computer program is stored, and the above-mentioned dual remote automobile diagnostic method is implemented when the computer program is executed by a processor.

The advantageous effects of the present application are that by establishing a remote communication connection with a target terminal, and sending automobile data required for the diagnosis to a service device via the connection address, the second diagnostic apparatus obtains the automobile data received by the service device while the first diagnostic apparatus is in continuous communication connection with the target terminal, so that the second diagnostic apparatus can perform remote diagnosis to the automobile. The target terminal may also directly perform remote control on the first diagnostic apparatus, so that the first diagnostic apparatus may be remotely controlled by repairers at the target terminal end to perform diagnosis. The faults of the automobile can be diagnosed using the dual remote diagnostic method, so that there is no need to drive the automobile to the repair shop for professional maintenance. For local diagnosis or single-remote diagnosis, a continuous remote communication can be carried out during the remote diagnosis process, thereby allowing a higher communication and diagnosis efficiency.

The implementations, characteristics and advantages of the present application will be further described below in conjunction with the accompanying drawings.

DETAILED DESCRIPTION OF THE EMBODIMENTS

It should be understood that the detailed embodiments described herein are merely to explain the application, but are not intended to limit the present application.

Figure 1:
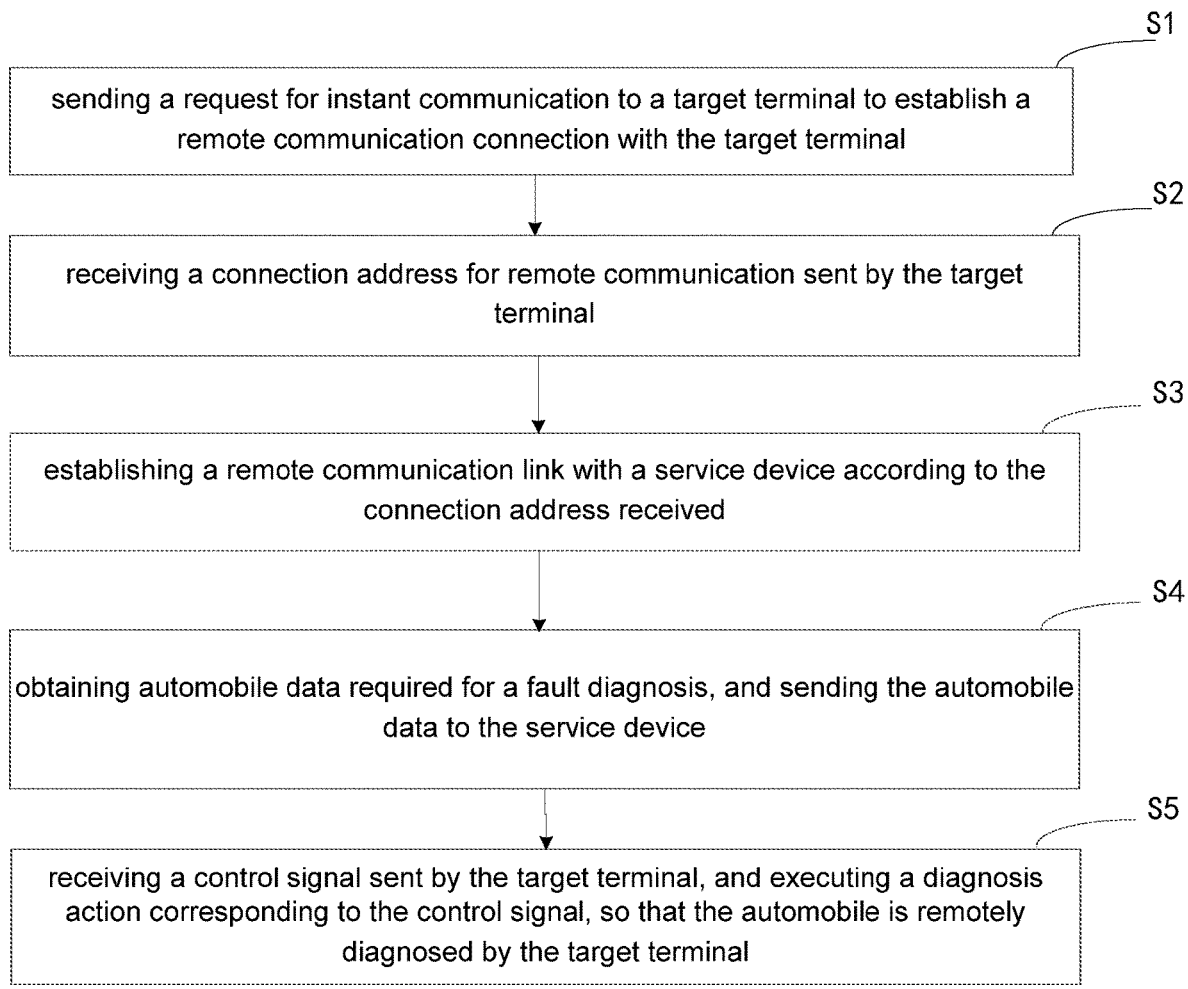
FIG. 1 is a flowchart of a dual remote automobile diagnostic method according to an embodiment of the present application.
Figure 2:
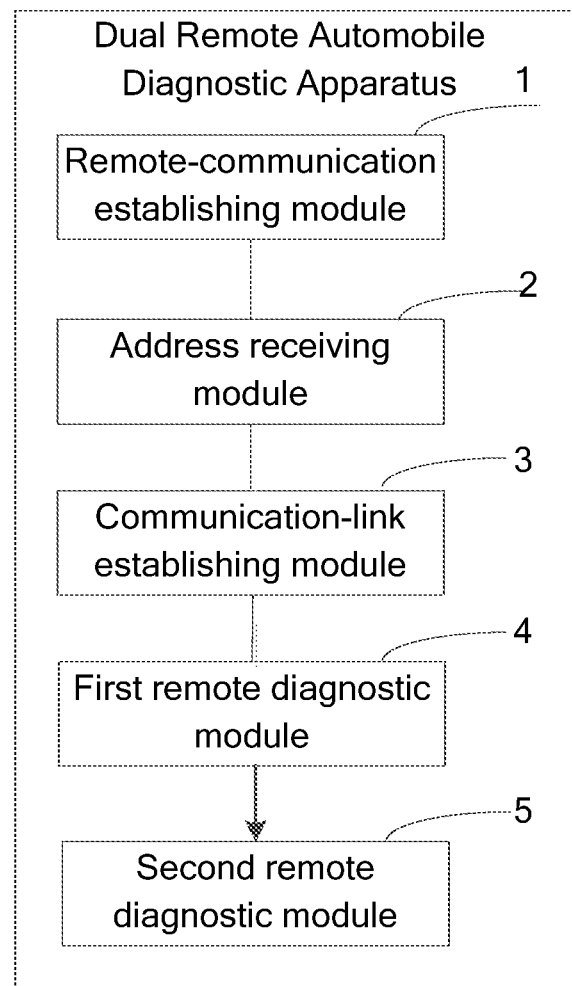
FIG. 2 is a block diagram of a dual remote automobile diagnostic apparatus according to an embodiment of the present application.
Figure 3:
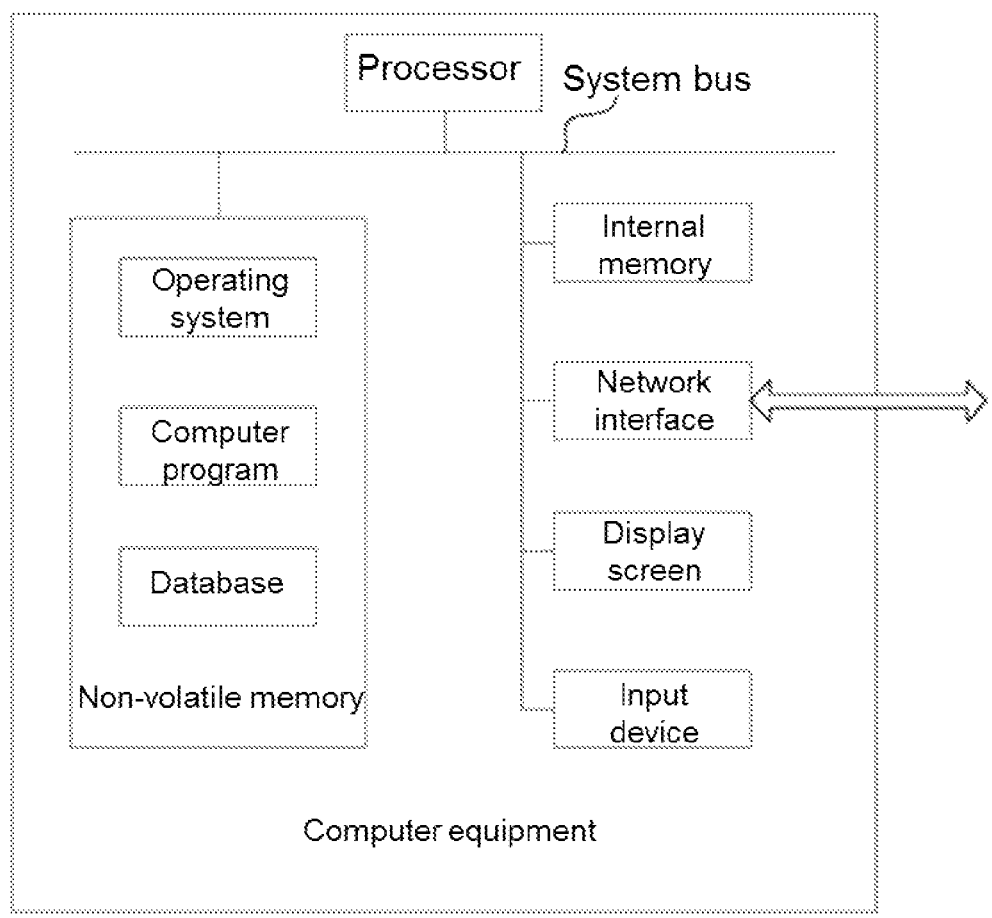
FIG. 3 is a schematic diagram of the internal structure of a computer equipment according to an embodiment of the present application.

As shown in FIGS. 1 to 3, the present application provides a dual remote automobile diagnostic method, which is applied to a first diagnostic apparatus in communication connection with an automobile, the method includes:

S1: sending a request for instant communication to a target terminal to establish a remote communication connection with the target terminal;

S2: receiving a connection address for remote communication sent by the target terminal;

S3: establishing a remote communication link with a service device according to the connection address received;

S4: obtaining automobile data required for a fault diagnosis, and sending the automobile data to the service device, wherein, the service device is in communication connection with a second diagnostic apparatus, and the second diagnostic apparatus is used for reading the automobile data and perform a remote diagnosis based on the automobile data; and S5: receiving a control signal sent by the target terminal, and executing a diagnosis action corresponding to the control signal, so that the automobile is remotely diagnosed by the target terminal.

According to the above-mentioned steps S1-S5, when a user performs a fault diagnosis, the first diagnostic apparatus may be in communication connection with the automobile such as an OBD (On-Board Diagnostics) interface wired connection, or Bluetooth, Wi-Fi and other wireless connections. By obtaining the relevant information of the automobile, the first diagnostic apparatus can directly diagnose the faults. If the problem cannot be diagnosed by the first diagnostic apparatus, or the user is not familiar with the first diagnostic apparatus, a request for instant communication may be sent by the first diagnostic apparatus to the target terminal to establish a remote communication connection with the target terminal. The target terminal may be a server with instant communication functions, such as voice, video, and other remote communication connections. By establishing a remote connection with the target terminal, repairers at the target terminal end can directly communicate with the user through the first diagnostic apparatus to assist the user to diagnose the automobile. Specifically, after initial communication with the user, a connection address for remote communication is sent from the target terminal to the first diagnostic apparatus, so that a remote communication link is established between the first diagnostic apparatus and the service device according to the connection address received. Then the automobile data required for the fault diagnosis is sent to the service device, so that the repairers at the target terminal can transmit the automobile data from the service device to the second diagnostic apparatus, and remotely diagnose the automobile based on the second diagnostic apparatus. It should be noted that the first diagnostic apparatus and the second diagnostic apparatus may be apparatus with different diagnostic functions. The automobile data containing the fault may be sent to the second diagnostic apparatus when the first diagnostic apparatus is unable to diagnose certain faults of the automobile, so that the fault can be diagnosed through the second diagnostic apparatus. Moreover, the remote communication with the target terminal may be maintained throughout diagnosis process, so that the user may communicate with the repairers at the server at any time. Since the user may not be capable of using the first diagnostic apparatus due to the lack of professional skills, the target terminal may also directly perform remote control to the first diagnostic apparatus, when the second diagnostic apparatus is user to diagnose the automobile, so that the repairers at the target terminal can remotely control the first diagnostic apparatus, that is, diagnose the fault using the first diagnostic apparatus. The faults can be diagnosed using the dual remote diagnostic method, so that there is no need to drive the automobile to the repair shop for professional maintenance. For local diagnosis or single-remote diagnosis, a continuous remote communication may be carried out during the remote diagnosis process, thereby allowing a higher communication and diagnosis efficiency.

In an embodiment, step S1 further includes:

S11: obtaining an online terminal list, where the online terminal list includes a plurality of online terminals;

S12: selecting one online terminal from the online terminal list as a target terminal, and establishing a session window for the target terminal, wherein the session window is used for interaction of communication information with the target terminal, and the communication information consists of one or more of picture information, voice information, video information, and text information;

S13: sending the request for instant communication to the target terminal in the session window, and determining whether the target terminal agrees to receive the request for instant communication, wherein the request for instant communication includes a voice communication request and a video communication request;

S14: receiving order information sent by the target terminal if the target terminal agrees to receive the request for instant communication, where the order information includes merchant information and diagnosis fee;

S15: determining whether to confirm the remote communication connection with the target terminal according to the order information;

S16: sending payment information to the target terminal according to the diagnosis fee, if the remote communication connection with the target terminal is confirmed; and S17: receiving a request of instant communication fed back by the target terminal in response to the payment information, in order to establish the remote communication connection with the target terminal.

According to the above-mentioned steps S11-S17, an online terminal list is displayed on a display interface of the first diagnostic apparatus. The online terminal list includes a plurality of service terminals of different merchants, and one of the plurality of online terminals is selected as a target terminal, so that a session window is established for the target terminal. A remote connection request can be sent directly to the target terminal after the session window is established, the remote connection request may be in a form of voice, video, text, and the like. When the remote connection request is received by the target terminal, order information may be sent to the target terminal if the establishment of the remote communication connection with the first diagnostic apparatus is agreed by the target terminal. The order information may include diagnosis fee, merchant information, automobile models that the repairer is skilled at, and the like. More preferably, the target terminal may directly obtain basic information such as the automobile model through the first diagnostic apparatus, and determine whether to establish a remote communication connection with the first diagnostic apparatus. More preferably, the target terminal may directly obtain basic information such as the automobile model through the first diagnostic apparatus, and determine whether to establish a remote communication connection with the first diagnostic apparatus. After the target terminal agrees to establish a remote communication connection with the first diagnostic apparatus, the first diagnostic apparatus may check the order information to choose whether to establish a remote communication connection with the target terminal. If the order information matches preset conditions, the diagnosis fee is then paid to the target terminal, and the dual remote diagnosis is carried out when the diagnosis fee is received by the target terminal. That is, the remote communication connection between the target terminal and the first diagnostic apparatus is a two-way selection, and the remote communication connection between the target terminal and the first diagnostic apparatus is established only after the diagnosis fee has been paid. The method provided may avoid situations such as the first diagnostic apparatus disconnects during diagnosis process, and may maintain the interests of the target terminal. Moreover, the method for establishing the remote communication connection may be more stable, so that the diagnosis may be more efficient.

In an embodiment, step S4 includes:

S41: receiving a request of automobile information sent by the target terminal for a plurality of times;

S42: obtaining the automobile data corresponding to each request of automobile information according the request of automobile information received;

S43: obtaining a current network delay value;

S44: determining whether the current network delay value exceeds a preset threshold, and sending the automobile data to a transit server if the current network delay value exceeds the preset threshold, so as to send the automobile data to the service device through the transit server; and S45: sending the automobile data to the service device based on UDP if the current network delay value does not exceed the preset threshold.

According to the above-mentioned steps S41-S45, transmission of the automobile data to the target terminal may be carried out several times. Specifically, the target terminal may send a request signal of automobile information to the first diagnostic apparatus according to its own needs, and the first diagnostic apparatus may send information corresponding to the request signal of automobile information accordingly. The target terminal may directly obtain historical diagnosis records in the first diagnostic apparatus, in order to quickly locate a location of the first diagnostic apparatus according to the historical diagnosis records, thus problems that occurred before may be acquired, and the request signal of required automobile information may be sent by the target terminal based on the historical diagnosis records. The repairers at the target terminal may communicate directly with the user through voice, video, text, and the like, so that a request signal of specific automobile information may be sent by the first diagnostic apparatus according to the communication. The target terminal does not have to obtain a large amount of various automobile data, but selects the automobile data related to the diagnosis according to previous diagnosis or the basic information of the automobile. Compared with the existing remote diagnosis, the present method requires less time and is more efficient. During remote communication, a current network status may be acquired by obtaining the current network delay value. The network is determined to be unstable if the current network delay value exceeds the preset threshold, and the automobile data may be sent to a transit server, and then sent to the service device from the transit server. This may avoid partial missing and loss of the automobile data when the network is unstable. If the current network delay value does not exceed the preset threshold, then the network is determined to be stable, so that the automobile data is sent to the service device based on UDP. Since the UDP does not need the connection authority, there is no time delay for obtaining data transmission authority between the first diagnostic apparatus and the service device, thus the transmission speed is more efficient. Compared with the Transmission Control Protocol (TCP), which needs to maintain the connection status in the first diagnostic apparatus, thereby requiring, for example, parameters for receiving and sending buffers, congestion control, and sequence numbers and confirmation numbers. Whereas the UDP does not need to maintain the connection status, nor tracking these parameters, so that the cost is low. Moreover, the UDP does not have congestion control, so that the first diagnostic apparatus has better control over the data to be sent and the timing to send the data, and the congestion control in the network does not affect the sending rate of the first diagnostic apparatus.

In an embodiment, after step S4, the method further includes:

S401: receiving programming data transmitted by the service device, the programming data being generated by the second diagnostic apparatus according to the automobile data; and S402: converting the programming data into a repair instruction and sending the programming data to the automobile, so that the automobile executes a corresponding program according to the repair instruction.

According to the above-mentioned steps S401-S402, since automobile failure is not always caused by hardware problems, software problems can also result in automobile failures, hence the automobile can be programmed remotely if there is no problems with the hardware, so that the programming data is converted into repair instructions and sent to the automobile by the first diagnostic apparatus, and the software on the automobile may be repaired according to the repair instructions. That is, the automobile can be remotely repaired through remote programming.

In an embodiment, before step S1, the method further includes:

S101: reading a unique identification serial number of the automobile;

S102: determining whether the unique identification serial number matches a vehicle identification number in a cloud server;

S103: obtaining vehicle information of the automobile according to the unique identification serial number if the unique identification serial number matches with the vehicle identification number in the cloud server, where the vehicle information consists of one or more of model information, vehicle type information, automobile manufacturer information, engine information, and chassis serial number information; and S104: performing a local diagnosis to the automobile based on the vehicle information.

According to the above-mentioned steps S101-S104, the unique identification serial number of the automobile, namely the vehicle identification number (VIN), is read when the first diagnostic apparatus establishes a communication connection with the automobile. Specifically, the VIN is acquired from the electronic control unit (ECU) of the vehicle by connecting the vehicle, and then is matched with the VIN on the cloud server to obtain the vehicle information of the automobile for a quick diagnosis. This solves the technical problems such as inefficiency and inaccuracy in the diagnosis process resulted from limitations of the operation through submenus.

The present application further provides a dual remote automobile diagnostic system, which includes:

a first diagnostic apparatus in communication connection with the automobile for obtaining automobile data required for fault diagnosis;

a target terminal in remote communication connection with the first diagnostic apparatus, the target terminal being used for establishing the remote communication connection with the first diagnostic apparatus, and remotely controlling the first diagnostic apparatus;

a service device in remote connection with the first diagnostic apparatus, for receiving the automobile data obtained by the first diagnostic apparatus; and a second diagnostic apparatus in communication connection with the service device, for remotely diagnosing the automobile based on the automobile data received from the service device.

In an embodiment, the first diagnostic apparatus includes:

an obtaining module for obtaining an online terminal list, the online terminal list including a plurality of online terminals;

an establishing module for selecting one online terminal from the online terminal list as a target terminal, and establishing a session window with the target terminal, the session window being used for interacting with the target terminal for communication information, and the communication information consisting of one or more of picture information, voice information, video information, and text information;

a sending module for sending a request for instant communication to the target terminal in the session window, and determining whether the target terminal agrees to receive the request for instant communication, where the request for instant communication includes a voice communication request and a video communication request;

a first receiving module for receiving order information from the target terminal if the target terminal agrees to receive the request for instant communication, the order information including merchant information and a diagnosis fee;

a determining module for determining whether to establish a remote communication connection with the target terminal according to the order information;

a confirmation module for sending payment information to the target terminal according to the diagnosis fee if the remote communication connection with the target terminal is determined to be established; and a second receiving module for receiving a request signal of instant communication fed back by the target terminal according to the payment information, so as to establish the remote communication connection with the target terminal.

As shown in FIG. 2, the present application further provides a dual remote automobile diagnostic apparatus, which includes:

a remote-communication establishing module (1) for sending a request for instant communication to a target terminal to establish a remote communication connection with the target terminal;

an address receiving module (2) for receiving a connection address for remote communication sent by the target terminal;

a communication-link establishing module (3) for establishing a remote communication link with a service device according to the connection address received;

a first remote diagnostic module (4) for obtaining automobile data required for a fault diagnosis, and sending the automobile data to the service device, where the service device is in communication connection with a second diagnostic apparatus, and the second diagnostic apparatus is used to read the automobile data and perform a remote diagnosis of faults based on the automobile data; and a second remote diagnostic module (5) for receiving a control signal sent by the target terminal, and executing a diagnosis action corresponding to the control signal, so that the automobile is remotely diagnosed by the target terminal.

As shown in FIG. 3, the present application further provides a computer equipment, the computer equipment may be a server, with an internal structure as shown in FIG. 3. The computer equipment includes a processor, a memory, a network interface, and a database connected through a system bus. The processor is used for providing calculation and control capabilities. The memory of the computer equipment includes a non-volatile memory and an internal memory. The non-volatile memory stores an operating system, a computer program, and a database. The memory provides a running environment for the operating system and the computer program in the non-volatile memory. The database of the computer equipment is used to store all the data required by the process of the timed task scheduling method, and the network interface of the computer equipment is used for communication with an external terminal through a network connection. The computer program is executed by the processor to realize the timing task scheduling method.

Those skilled in the art can understand that the structure shown in FIG. 3 is merely a block diagram of a part of the structure related to the embodiment of the present application, and does not constitute a limitation on the computer equipment to which the proposal of the present application is applied.

An embodiment of the present application further provides a non-transitory computer-readable storage medium on which a computer program is stored, and any one of the above-mentioned timing task scheduling methods is implemented when the computer program is executed by a processor.

Those skilled in the art can understand that all or part of the processes in the methods of the above-mentioned method in the embodiments can be implemented by instructing relevant hardware through a computer program. The computer program may be stored in a non-volatile computer readable storage medium, and the computer program may include processes of the above-mentioned method when being executed. Any reference to memory, storage, database or other media provided in this application and used in the embodiments may include non-volatile and/or volatile memory. Non-volatile memory may include read-only memory (ROM), programmable ROM (PROM), electrically programmable ROM (EPROM), electrically erasable programmable ROM (EEPROM), or flash memory. Volatile memory may include random access memory (RAM) or external cache memory. For illustrative but not limiting purpose, RAM is available in various forms, such as static RAM (SRAM), dynamic RAM (DRAM), synchronous DRAM (SDRAM), dual data rate SDRAM (DDRSDRAM), enhanced SDRAM (ESDRAM), Synch-link DRAM (SLDRAM), Rambus direct RAM (RDRAM), direct memory bus dynamic RAM (DRDRAM), and memory bus dynamic RAM (RDRAM), and the like.

It should be noted that in this article, the terms "include", "comprise" or any other variants thereof are not intended to be exclusive, so that a process, device, article or method including a series of elements not only includes those elements, but also includes other elements that are not explicitly listed, or elements inherent to the process, device, article, or method.

The above are only the preferred embodiments of the present application, not intended to limit the scope thereof. Any equivalent structure or equivalent process transformation made by using the contents of the description and drawings of the present application, or directly or indirectly applied to other related technical field, shall fall within the scope of protection of the present application.

What is claimed is:

1. A dual remote automobile diagnostic method, which is applied to a first diagnostic apparatus in communication connection with an automobile, the method comprising:
   reading a unique identification serial number of the automobile;
   determining whether the unique identification serial number matches a vehicle identification number in a cloud server;
   obtaining vehicle information of the automobile according to the unique identification serial number if the unique identification serial number matches with the vehicle identification number in the cloud server, the vehicle information consisting of one or more of model information, vehicle type information, automobile manufacturer information, engine information, and chassis serial number information;
   performing a local diagnosis to the automobile based on the vehicle information;
   sending a request for instant communication to a target terminal to establish a remote communication connection with the target terminal;
   receiving a connection address for remote communication sent by the target terminal;
   establishing a remote communication link with a service device according to the connection address received while maintaining the remote communication connection with the target terminal;
   obtaining automobile data required for a fault diagnosis, and sending the automobile data to the service device, wherein, the service device is in communication connection with a second diagnostic apparatus, and the second diagnostic apparatus is used for reading the automobile data and perform a remote diagnosis based on the automobile data; and
   receiving a control signal sent by the target terminal, and executing a diagnosis action corresponding to the control signal, so that the automobile is remotely diagnosed by the target terminal.

2. The dual remote automobile diagnostic method according to claim 1, wherein sending a request for instant communication to a target terminal to establish a remote communication connection with the target terminal comprises:
   obtaining an online terminal list, the online terminal list including a plurality of online terminals;
   selecting one online terminal from the online terminal list as a target terminal, and establishing a session window for the target terminal, the session window being used for interaction of communication information with the target terminal, and the communication information consisting of one or more of picture information, voice information, video information, and text information;
   sending the request for instant communication to the target terminal in the session window, and determining whether the target terminal agrees to receive the request for instant communication, the request for instant communication including a voice communication request and a video communication request;
   receiving order information sent by the target terminal if the target terminal agrees to receive the request for instant communication, the order information including merchant information and a diagnosis fee;
   determining whether to establish the remote communication connection with the target terminal according to the order information;
   sending payment information to the target terminal according to the diagnosis fee if the remote communication connection with the target terminal is determined to be established; and
   receiving a request signal of instant communication fed back by the target terminal in response to the payment information, in order to establish the remote communication connection with the target terminal.

3. The dual remote automobile diagnostic method according to claim 1, wherein obtaining automobile data required for a fault diagnosis and sending the automobile data to the service device comprises:
   receiving a request of automobile information sent by the target terminal for a plurality of times;
     obtaining the automobile data corresponding to each request of automobile information according the request of automobile information received;
     obtaining a current network delay value;
     determining whether the current network delay value exceeds a preset threshold, and sending the automobile data to a transit server if the current network delay value exceeds the preset threshold, so as to send the automobile data to the service device through the transit server; and
     sending the automobile data to the service device based on User Datagram Protocol (UDP) if the current network delay value does not exceed the preset threshold.

4. The dual remote automobile diagnostic method according to claim 1, wherein after obtaining automobile data required for a fault diagnosis and sending the automobile data to the service device, the method further comprises:
   receiving programming data transmitted by the service device, the programming data being generated by the second diagnostic apparatus according to the automobile data; and
   converting the programming data into a repair instruction and sending the instructions to the automobile, so that the automobile executes a corresponding program according to the repair instruction.

5. A dual remote automobile diagnostic apparatus, comprising:
   a remote-communication establishing module for sending a request for instant communication to a target terminal to establish a remote communication connection with the target terminal;
   an address receiving module for receiving a connection address for remote communication sent by the target terminal;
   a communication-link establishing module for establishing a remote communication link with a service device according to the connection address received while maintaining the remote communication connection with the target terminal;

a first remote diagnostic module for obtaining automobile data required for a fault diagnosis, and sending the automobile data to the service device, the service device being in communication connection with a second diagnostic apparatus, and the second diagnostic apparatus being used to read the automobile data and perform a remote diagnosis of faults based on the automobile data; and a second remote diagnostic module for receiving a control signal sent by the target terminal, and executing a diagnosis action corresponding to the control signal, so that the automobile is remotely diagnosed by the target terminal;

wherein the remote-communication establishing module, before sending the request for instant communication to the target terminal, is further configured to;

read a unique identification serial number of the automobile;

determine whether the unique identification serial number matches a vehicle identification number in a cloud server;

obtain vehicle information of the automobile according to the unique identification serial number if the unique identification serial number matches with the vehicle identification number in the cloud server, the vehicle information consisting of one or more of model information, vehicle type information, automobile manufacturer information, engine information, and chassis serial number information;

perform a local diagnosis to the automobile based on the vehicle information.

6. A computer equipment, comprising a non-transitory memory and a processor, wherein the non-transitory memory stores a computer program, and the processor implements the dual remote automobile diagnostic method according to claim 1 when the processor executes the computer program.

7. A computer equipment, comprising a non-transitory memory and a processor, wherein the non-transitory memory stores a computer program, and the processor implements the dual remote automobile diagnostic method according to claim 2 when the processor executes the computer program.

8. A computer equipment, comprising a non-transitory memory and a processor, wherein the non-transitory memory stores a computer program, and the processor implements the dual remote automobile diagnostic method according to claim 3 when the processor executes the computer program.

9. A computer equipment, comprising a non-transitory memory and a processor, wherein the non-transitory memory stores a computer program, and the processor implements the dual remote automobile diagnostic method according to claim 4 when the processor executes the computer program.

10. A non-transitory computer-readable storage medium on which a computer program is stored, wherein the dual remote automobile diagnostic method according to claim 1 is implemented when the computer program is executed by a processor.

11. A non-transitory computer-readable storage medium on which a computer program is stored, wherein the dual remote automobile diagnostic method according to claim 2 is implemented when the computer program is executed by a processor.

12. A non-transitory computer-readable storage medium on which a computer program is stored, wherein the dual remote automobile diagnostic method according to claim 3 is implemented when the computer program is executed by a processor.

13. A non-transitory computer-readable storage medium on which a computer program is stored, wherein the dual remote automobile diagnostic method according to claim 4 is implemented when the computer program is executed by a processor.

* * * * *